United States Patent
Chen et al.

(10) Patent No.: US 8,160,182 B2
(45) Date of Patent: Apr. 17, 2012

(54) SYMBOL DETECTOR AND SPHERE DECODING METHOD

(75) Inventors: Chin-Hung Chen, Tainan (TW);
Pang-An Ting, Taichung County (TW);
Cheng-Ming Chen, Hsinchu (TW);
Chih-Yu Chen, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 517 days.

(21) Appl. No.: 12/410,416

(22) Filed: Mar. 24, 2009

(65) Prior Publication Data

US 2010/0014606 A1  Jan. 21, 2010

(30) Foreign Application Priority Data

Jul. 16, 2008  (TW) .............................. 97126922 A

(51) Int. Cl.
*H04L 27/06* (2006.01)
*H03D 1/24* (2006.01)
(52) U.S. Cl. ........................................ 375/341; 375/320
(58) Field of Classification Search .................. 375/316, 375/320, 324, 329, 340, 341, 262; 329/301, 329/311, 313, 345, 347, 349; 714/794, 795, 714/796, 746, 786
See application file for complete search history.

(56) References Cited

U.S. PATENT DOCUMENTS

| | | | |
|---|---|---|---|
| 7,489,746 B1 * | 2/2009 | Awater et al. ................. | 375/341 |
| 7,864,896 B2 * | 1/2011 | Hwang et al. ................. | 375/341 |
| 7,912,140 B2 * | 3/2011 | Anholt et al. ................. | 375/262 |
| 7,965,782 B1 * | 6/2011 | Vijayan et al. ................ | 375/262 |
| 7,978,798 B2 * | 7/2011 | Hwang et al. ................. | 375/349 |
| 7,995,677 B2 * | 8/2011 | Lee et al. ...................... | 375/316 |
| 8,009,598 B2 * | 8/2011 | Chen et al. .................... | 370/310 |
| 2008/0095257 A1 * | 4/2008 | Maeda et al. ................. | 375/262 |
| 2008/0153444 A1 * | 6/2008 | Chen et al. .................... | 455/205 |
| 2008/0310556 A1 * | 12/2008 | Lee et al. ...................... | 375/340 |
| 2009/0003476 A1 * | 1/2009 | Rog et al. ...................... | 375/260 |
| 2009/0003499 A1 * | 1/2009 | Chiu et al. .................... | 375/347 |
| 2009/0060078 A1 * | 3/2009 | van Zelst et al. ............. | 375/262 |
| 2010/0008441 A1 * | 1/2010 | Murakami et al. ........... | 375/267 |
| 2010/0046658 A1 * | 2/2010 | Yosoku et al. ................ | 375/267 |
| 2010/0232549 A1 * | 9/2010 | Oizumi ......................... | 375/341 |
| 2010/0296598 A1 * | 11/2010 | Li et al. ......................... | 375/267 |

OTHER PUBLICATIONS

Wang et al., Tree-Structured User Scheduling Algorithm and Its Implementation in multi-User MIMO Systems, 2008, Wireless Communications and Mobile Computing Conference, 2008. IWCMC '08. International, pp. 893-898.*

(Continued)

*Primary Examiner* — Lawrence B Williams

(57) ABSTRACT

A symbol detector with a sphere decoding method implemented therein. A baseband signal is received to determine a maximum likelihood solution using the sphere decoding algorithm. A QR decomposer performs a QR decomposition process on a channel response matrix to generate a Q matrix and an R matrix. A matrix transformer generates an inner product matrix of the Q matrix and the received signal. A scheduler reorganizes a search tree, and takes a search mission apart into a plurality of independent branch missions, wherein the search tree defines a full search depth $N_{full}$. A plurality of Euclidean distance calculators are controlled by the scheduler to operate in parallel, wherein each has a plurality of calculation units cascaded in a pipeline structure to search for the maximum likelihood solution based on the R matrix and the inner product matrix.

28 Claims, 12 Drawing Sheets

OTHER PUBLICATIONS

L.G. Barbero et al. "Performance Analysis of a Fixed-Complexity Sphere Decoder in High-Demensional Mimo Systems", in IEEE International Conference on Acoustics, Speech, and Signal Processing (ICASSP '06). vol. 4, Toulouse, France, May 2006, p. 557-560.

L.G. Barbero et al. "Rapid Prototyping of a Fixed-Throughput Sphere Decoder for Mimo System", in IEEE International Conference on Communications (IDD '06), Istanbul, Turkey, Jun. 2006, pp. 3082-3087.

* cited by examiner

SYMBOL DETECTOR AND SPHERE DECODING METHOD

TECHNICAL FIELD

The disclosure relates to symbol detector and sphere decoding method.

BACKGROUND

As the demand for high throughput wireless communication grows, the importance of high spectrum efficiency is increasing. A Multiple-Input-Multiple-Output (MIMO) system has a plurality of antennas disposed at both the transmitter and the receiver sides. Thus, transmission rate can be increased by simultaneously transmitting multiple data streams within one frequency band. However, multiple data streams may interfere with each other at the receiver side. Thus, signal separation and detection techniques are required for decoupling.

Maximum likelihood detection (MLD) is a prevailing algorithm used to search among all possible transmitted symbol vectors at a receiver side to obtain a solution most resembling the transmitted one. FIG. 1 shows a conventional search tree in which a plurality of search paths is presented. Assuming there are four symbols transmitted by four transmit antennas at the transmitter side, the search process is performed within a search tree comprising four layers $L_4$ to $L_1$, wherein each layer corresponds to one specific transmit antenna. If 64QAM (Quadrature Amplitude Modulation) is adopted for each symbol, there would be 64 possible nodes $P_1$ to $P_{64}$ to be searched at each layer. As shown in FIG. 1, there are a total of $64^4$ combinations for four layers to be examined, which is inefficient for practical implementation.

Thus, to decrease algorithmic complexity, a sphere decoding (SD) algorithm has been proposed. An upper limit of a cost function is employed to effectively restrict the search range of an optimal path by excluding unnecessary combinations. The upper limit value, $r^2$, is conventionally referred to as the radius of a sphere. During each search step, every path 110 connecting one node to another node residing at the next layer causes a corresponding Euclidean Distance Increment (EDI), wherein an accumulation of the EDIs from the top layer to the current layer is referred to as a Partial Euclidean Distance (PED) of the partial search path. The PED is then compared with the sphere radius $r^2$ to determine the validity of the partial search result. When the search process reaches the bottom layer of the search tree, a Euclidean distance (ED) of a complete search path is then obtained.

Meanwhile, according to the Schnorr-Euchner (SE) algorithm, when the search proceeds to the $m^{th}$ layer, a node closest to the sphere center at a specific layer will be first examined. The algorithmic principle is to examine a node of a smaller EDI with a higher priority, by which the average time to obtain an optimal result can be shortened because the radius of the sphere will shrink more quickly. Furthermore, another algorithm, a Fixed-Complexity Sphere Decoding algorithm, to decrease algorithmic complexity has been proposed to employ a modified V-BLAST sorting algorithm to rearrange the search trees such that a full search scheme is adopted over several top layers, wherein a single direction search scheme is performed over the other layers to achieve a near optimal solution. The V-BLAST sorting algorithm, however, requires significant computation power, thus it is inefficient for mobile systems where frequent sorting is required to account for time-varying channels.

SUMMARY

Consistent with an exemplary embodiment, there is provided a symbol detector with a sphere decoding method implemented therein. A baseband signal is received to determine a maximum likelihood solution using the sphere decoding algorithm. A QR decomposer performs a QR decomposition process on a channel response matrix to generate a Q matrix and an R matrix. A matrix transformer generates an inner product matrix of the Q matrix and the received baseband signal. A memory buffers the R matrix and the inner product matrix. A scheduler organizes a search tree, and takes a search mission apart into a plurality of independent branch missions. A plurality of Euclidean distance calculators are controlled by the scheduler to operate in parallel, wherein each comprise a plurality of calculation units cascaded in a pipeline structure to search for the maximum likelihood solution based on the R matrix and the inner product matrix. The channel response matrix comprises a plurality of column vectors. The QR decomposer sorts the column vectors in a particular order so that the generated R matrix is characterized that the $N_{full}$ smallest lower-right diagonal elements are arranged first while the other diagonal elements are sorted from the upper-left to the lower-right in an incremental order.

Also consistent with an embodiment, there is provided a sphere decoding method, for receiving a baseband signal to search a maximum likelihood solution. A QR decomposition process is performed on a channel response matrix to generate a Q matrix and an R matrix. An inner product matrix of the Q matrix and the baseband signal, is then generated. The R matrix and the inner product matrix are buffered for further procedures. A searching sequence of a plurality of independent branch missions originated from a search tree, is determined. The maximum likelihood solution is calculated based on the R matrix and the inner product matrix. In the QR decomposition process, the column vectors are sorted in a particular order to generate an R matrix comprising $N_{full}$ smallest diagonal elements arranged in the most lower-right cornet while the other diagonal elements sorted from the upper-left to the lower-right in an incremental order, where $N_{full}$ is a variable denoting the full search depth.

BRIEF DESCRIPTION OF THE DRAWINGS

The exemplary embodiment can be more fully understood by reading the subsequent detailed description and examples with references made to the accompanying drawings, wherein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of systems and methods consistent with aspects related to the embodiment as recited in the appended claims.

Based on experimentation, if the SE algorithm is incorporated with the depth first sphere decoding algorithm, it is of high probability that the first candidate solution (the search path that reaches the bottom layer (m=1) for the first time) will precisely reach the maximum likelihood solution. This is particularly true when the SNR is high. In other words, if the order of tree layers is rearranged based on the SNR and just perform a full search process on a plurality of low SNR layers and a single direction search process on the other layers, the complexity of the search process to obtain the maximum likelihood solution can be significantly decreased.

Figure 1:
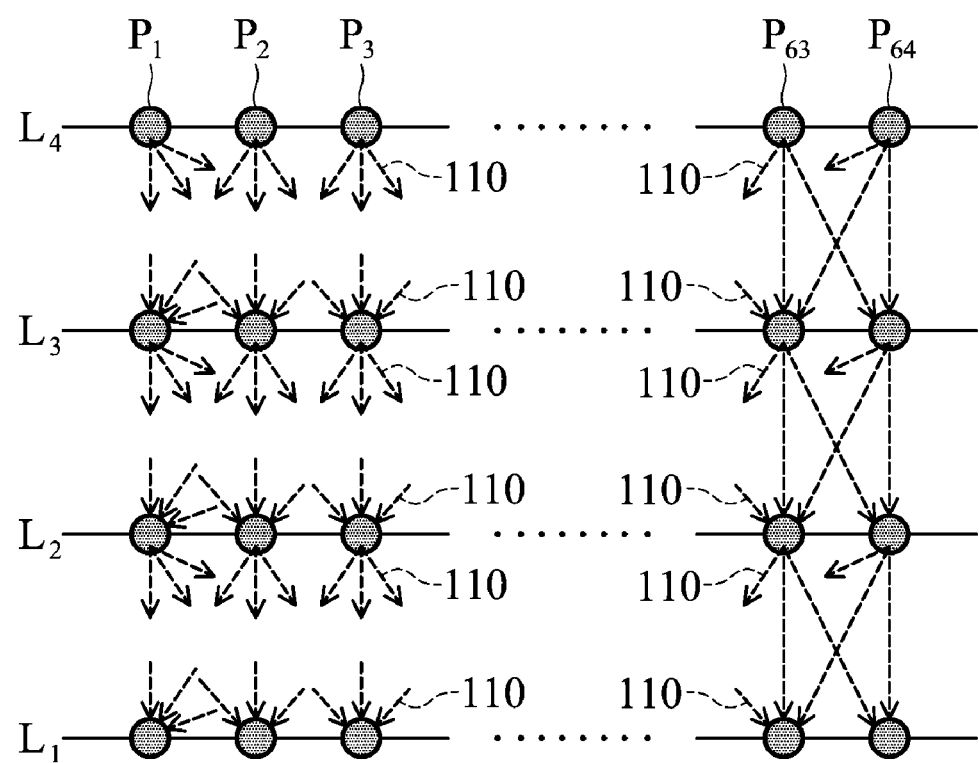
FIG. 1 shows a conventional search tree.
Figure 2:
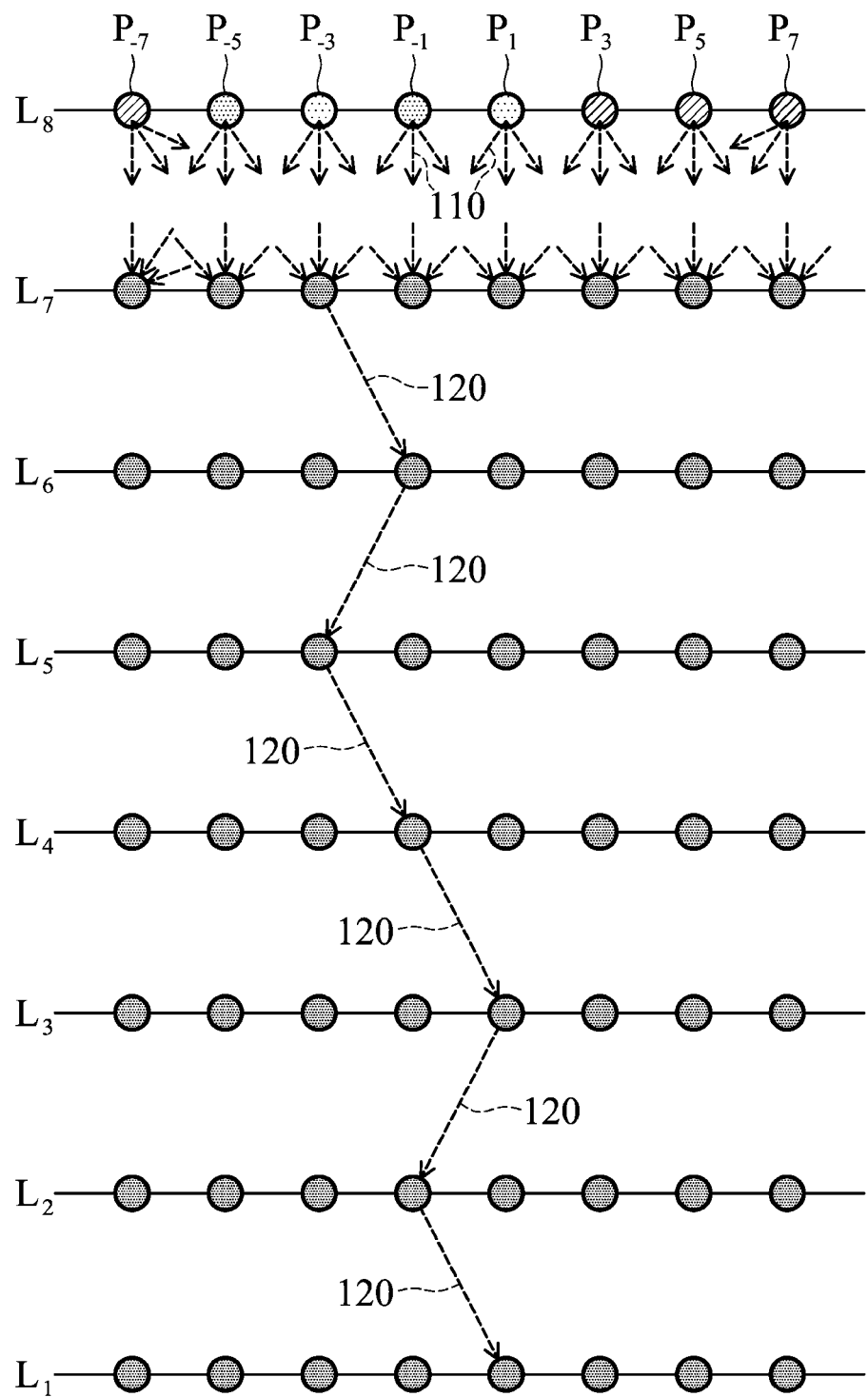
FIG. 2 shows a search paths in accordance with an embodiment.

FIG. 2 shows search paths in accordance with an embodiment. In the embodiments, a search tree is established based on real number models of received signals and a channel response matrix, comprising a plurality of layers. For example, if a transmitter has four antennas, wherein each transmits a complex symbol, eight layers $L_8$ to $L_1$, each corresponding to a real part or an imaginary part of a transmitted symbol, can be established. Meanwhile, if the signal is modulated by 64QAM, the symbol value of a real or imaginary part may be $-7, -5, -3, -1, 1, 3, 5,$ or 7, or a total of eight possible values. Thus, each layer comprises eight nodes each representing one possible symbol value. In the embodiment, a sorting scheme is employed when performing the QR decomposition to rearrange the search tree into a desired form. Specifically, layers adequate for full search are allocated to the upper part of the search tree, such as layers $L_8$ and $L_7$. Other layers adequate for single direction search, such as layers $L_6$ to $L_1$, are allocated to the lower parts of the search tree. The full search scheme examines all nodes within $L_8$ and $L_7$ to form a total of 64 paths, wherein each is denoted as path 110. Following each path 110, only one search path 120 throughout the other layers $L_6$ to $L_1$ is derived. Thus, a total of [8×8×1×1×1×1×1×1] search paths are formed to be examined. The number of nodes to be examined in each layer can also be flexibly defined. For example, if all nodes are selected for full search layers (i.e., $L_7$ and $L_8$), two nodes are selected for $L_5$ and $L_6$, and only one node is selected for $L_4$ to $L_1$ during the search process, wherein the number of total paths to be examined is [8×8×2×2×1×1×1×1]. The following embodiments explain how the layers are sorted and how the nodes are selected.

Figure 3:
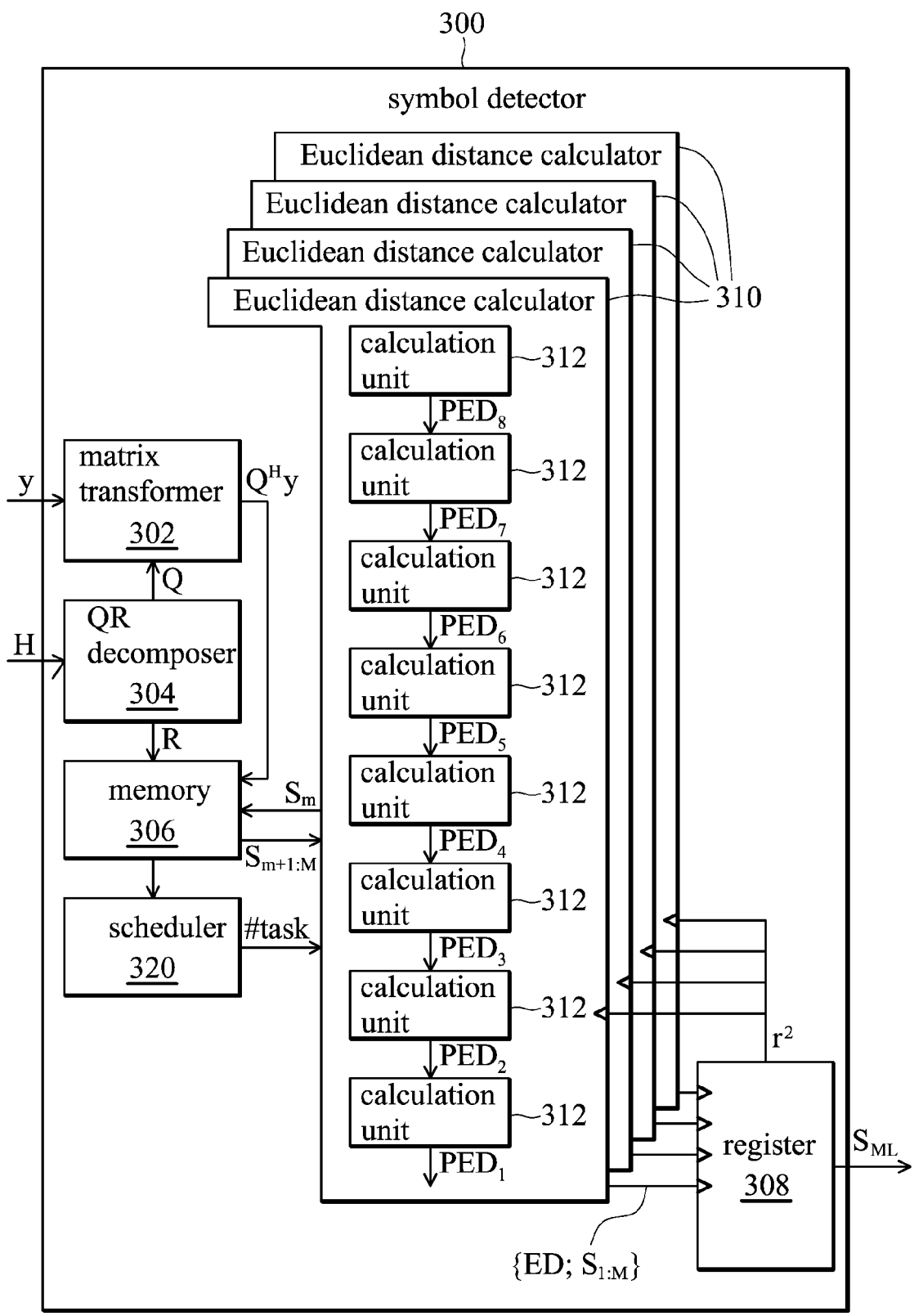
FIG. 3 shows a symbol detector in accordance with an embodiment.

FIG. 3 shows a symbol detector in accordance with an embodiment. The input value to the symbol detector 300 is a received signal vector y and a channel response matrix H. A QR decomposer 304 performs a QR decomposition process on the channel response matrix H to generate a Q matrix and an R matrix. A matrix transformer 302 then generates an inner product matrix from the Q matrix and the received signal vector y. In the QR decomposition process, a particular sorting scheme is employed to make the inner product matrix and the R matrix workable under the proposed hybrid search scheme. The maximum likelihood solution of the sphere decoding method to be acquired, can be expressed as:

$$\hat{s}_{ML} = \min_{s \in \Lambda} \|Q^H y - R \cdot s\|^2, \quad (1)$$

where s is a variable vector denoting a set of possible symbol values. In the embodiment, the vector s represents eight nodes selected from the eight layers. The outputs from the matrix transformer 302 and the QR decomposer 304 are buffered in a memory 306. A scheduler 320 is dedicated to program a plurality of search missions that can be simultaneously processed in multiple Euclidean distance calculators 310 within the symbol detector 300. Each Euclidean distance calculator 310 reads the R matrix and the inner product matrix from the memory 306 to implement Formula (1). More specifically, the scheduler 320 may categorize all possible paths examined by the full search and single direction search processes shown in FIG. 2 into a plurality of independent single direction branch missions, and deliver control signals #task to the Euclidean distance calculators 310 to simultaneously process the single direction branch missions. Each single direction branch mission is responsible for one possible solution. When a single direction branch mission is in progress, the calculation unit 312 selects one node that causes the least EDI at each layer. An ED accumulated from EDIs is then compared with the upper limit value $r^2$ in the comparator 308 to determine whether a solution with the minimal ED has been found. By applying the well-known Schnorr-Euchner algorithmic enumeration method at the $N_{full}$ full search layers, the sequence to dispatch all single direction branch missions to a plurality of Euclidean distance calculators 310 is under the control of the scheduler 320. In each Euclidean distance calculator 310, a plurality of calculation units 312 are cascaded in a pipeline structure, allowing different stages of different single direction branch missions to be processed simultaneously. Thus, maximizing hardware utilization.

Figure 4:
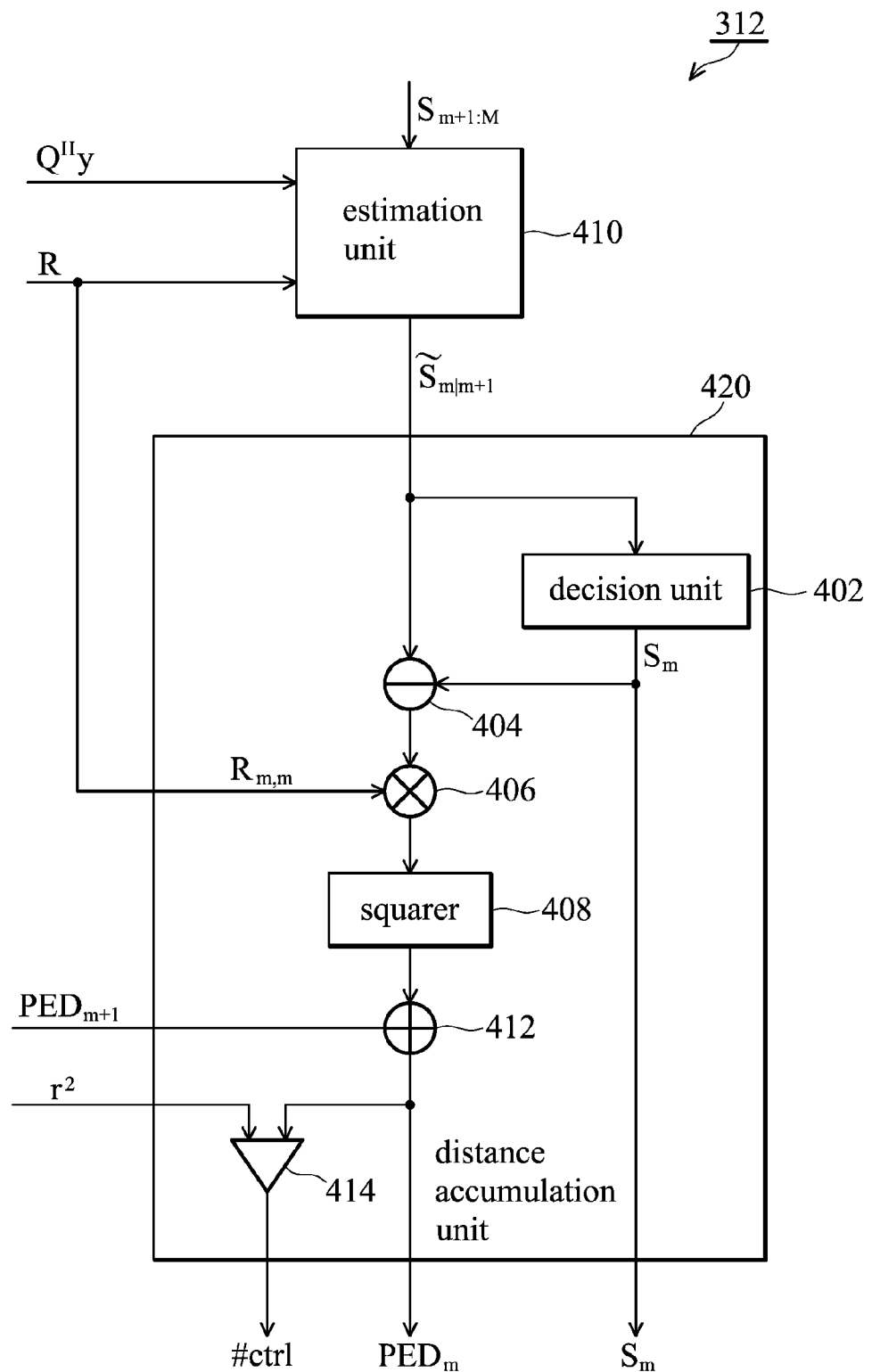
FIG. 4 shows a calculation unit according to the exemplary embodiment in FIG. 3.

FIG. 4 shows an exemplary embodiment of calculation units 312 according to FIG. 3. Since every calculation unit 312 repeatedly implements the same formula, the hardware structure can be represented in FIG. 4, in which a node ($s_m$) that causes the least PED increment is determined as the decision value. Note that the resultant PED ($PER_m$) is also calculated by the calculation unit 312. An estimation unit 410 receives the inner product matrix, the R matrix and all prior nodes ($s_{m+1}, s_{m+2}, s_M$) to calculate a sphere center $\tilde{S}_{m|m+1}$. The sphere center is used to perform PED calculations, and is also a reference for the scheduler 320 to program the process order of single direction branch missions. Similar to the conventional Schnorr-Euchner (SE) algorithm, if the scheduler 320 has a need to program more than one node at a particular layer to branch out a partial search path, the scheduler determines a priority order according to the sphere center. Specifically, a node that is closer to the sphere center will have a higher priority to be examined. When performing the PED calculation, the estimation unit 410 calculates the sphere center based on the following formula:

$$\tilde{s}_{m|m+1} = \frac{-1}{r_{m,m}} \left\{ \sum_{j=m+1}^{M} r_{m,j}(s_j - 1) + \sum_{j=m+1}^{M} r_{m,j} - \tilde{y}_m \right\}, \quad (2)$$

where m represents a currently examined layer index, and M denotes the top layer index while 1 is the bottom layer index. $\tilde{S}_{m|m+1}$ represents value of the sphere center. $r_{m,m}$ is the $m^{th}$ diagonal element in the R matrix, and $r_{m,j}$ is the $(m,j)^{th}$ element in the R matrix. $s_j$ is a node at the $j^{th}$ layer examined by a current single direction branch mission, and the node is possibly a value among ±1, ±3, ±5 and ±7. $\tilde{y}_m$ is the $m^{th}$ element value in the inner product matrix. When a single direction branch mission is in progress, the $$\sum_{j=m+1}^{M} r_{m,j} \tilde{y}_m$$

in Formula (2) is a fixed value, thus only one circuit is required to perform the calculation. The $(s_j-1)$ is possibly a value among 0, ±2, ±4, ±6 and −8, thus only a shifter and an adder are needed to calculate the term $$\sum_{j=m+1}^{M} r_{m,j}(s_j-1)$$

in Formula (2). The design avoids usage of multipliers, which can significantly simplify circuit complexity and reduce costs.

In the calculation units 312, an accumulation circuit 420 then calculates a current layer PED based on the sphere center, all prior nodes and a prior layer PED. The accumulation circuit 420 implements the following formula:

$$PED_m = PED_{m+1} + r_{m,m}^2 (s_m - \tilde{S}_{m|m+1})^2 \quad (3),$$

where $PED_m$ is the PED accumulated from the top layer to the $m^{th}$ layer, and $s_m$ is a possible hard decision value at the $m^{th}$ layer. Formula (3) can be implemented by a simple circuit. For example, the accumulation circuit 420 may comprise a subtractor 404 to subtract the sphere center by the hard decision value. A multiplier 406 may generate a product of the diagonal element $r_{m,m}$ of an R matrix and an output from the subtractor 404. A squarer 408 would then acquire the $r_{m,m}^2(s_m-\tilde{S}_{m|m+1})$ of Formula (3), and an adder 412 would add the output from the squarer 408 with $PED_{m+1}$ to obtain $PED_m$.

In FIG. 3, the symbol detector 300 further comprises a comparator 308 for storing the upper limit value $r^2$. Each accumulation circuit 420 in FIG. 4 comprises a comparator 414 for comparing the upper limit value $r^2$ with each PED. If the PED is less than the upper limit value $r^2$, the single direction branch mission is continued. Otherwise, the single direction branch mission is discarded. Meanwhile, every time the Euclidean distance calculator 310 completes a single direction branch mission, the final output PED is assessed as the Euclidean distance (ED). The ED is also compared with the upper limit value $r^2$. If the ED is less than the upper limit value $r^2$, a new maximum likelihood solution is deemed found, and the upper limit value $r^2$ in the comparator 308 is updated by the value of ED. Since a plurality of Euclidean distance calculators 310 are processed in parallel, whenever one of the Euclidean distance calculators 310 finds a newer upper limit value $r^2$, the partial search path with a PED higher than the upper limit value $r^2$ are immediately terminated. Hence, the search process can be rapidly completed.

Figure 5:
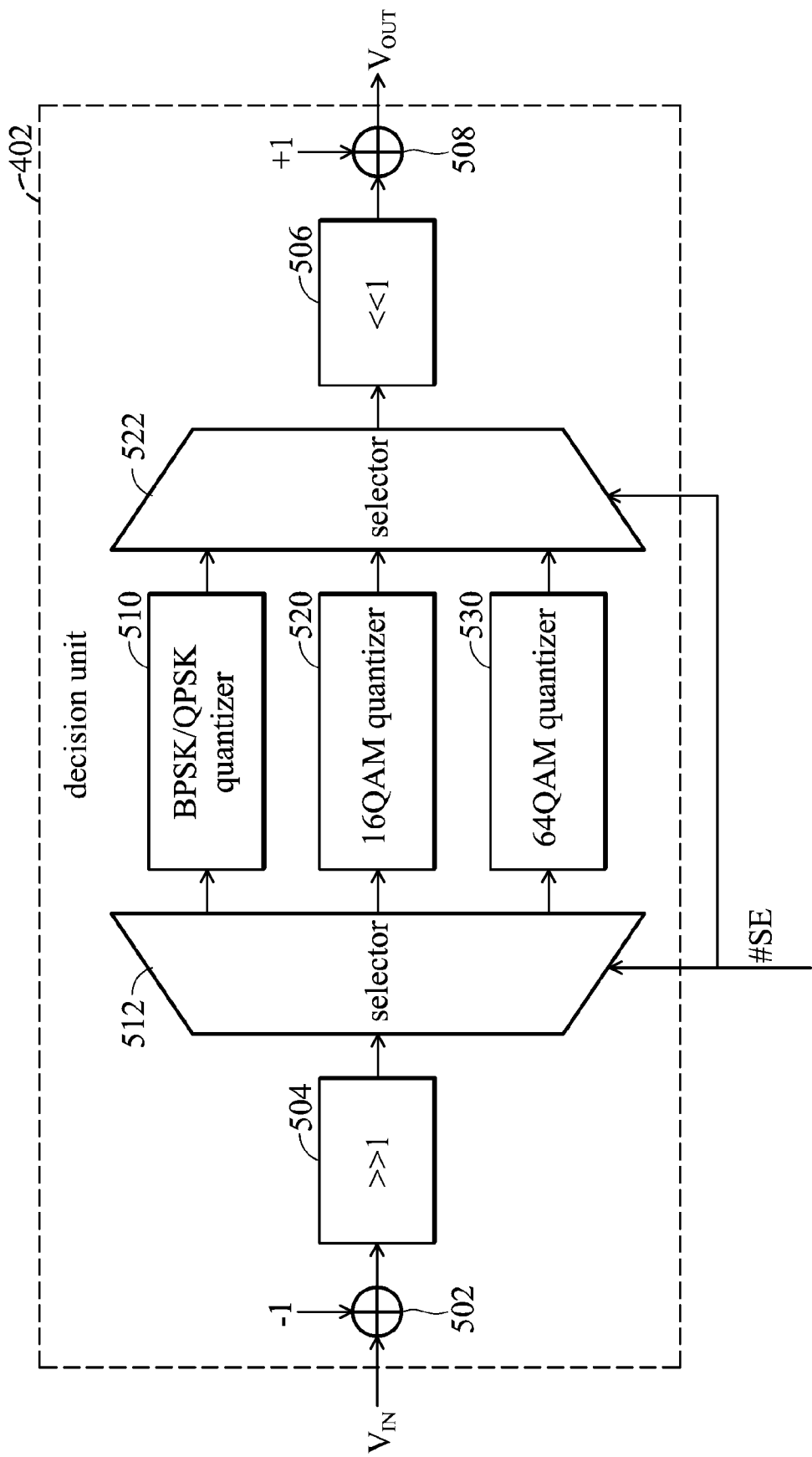
FIG. 5 shows a decision unit in accordance with an embodiment in FIG. 4.

FIG. 5 shows an exemplary embodiment of the decision unit 402 in FIG. 4. When an input value $V_{IN}$ is input for a hard decision, a first subtractor 502 subtracts the input value $V_{IN}$ by 1, and then the first shifter 504 right shifts the output of the first subtractor 502 by 1 bit. A pair of selectors 512 and 522 are selectively connected to one of the 1-bit BPSK/QPSK quantizer 510, 2-bit 16QAM quantizer 520 and 3-bit 64QAM quantizer 530 based on a selection signal #SE, allowing the right shifted output from the first shifter 504 to be quantized. Meanwhile, the output from the BPSK/QPSK quantizer 510, 16QAM quantizer 520 or 64QAM quantizer 530 are passed to a second shifter 506 which then left shifts the result outputs by 1 bit. At last, the first adder 508 adds the output of the second shifter 506 by 1 to generate an output value $V_{OUT}$. In practice, the input value $V_{IN}$ is the sphere center, and the output value $V_{OUT}$ is the hard decision value of the sphere center.

Figure 6:
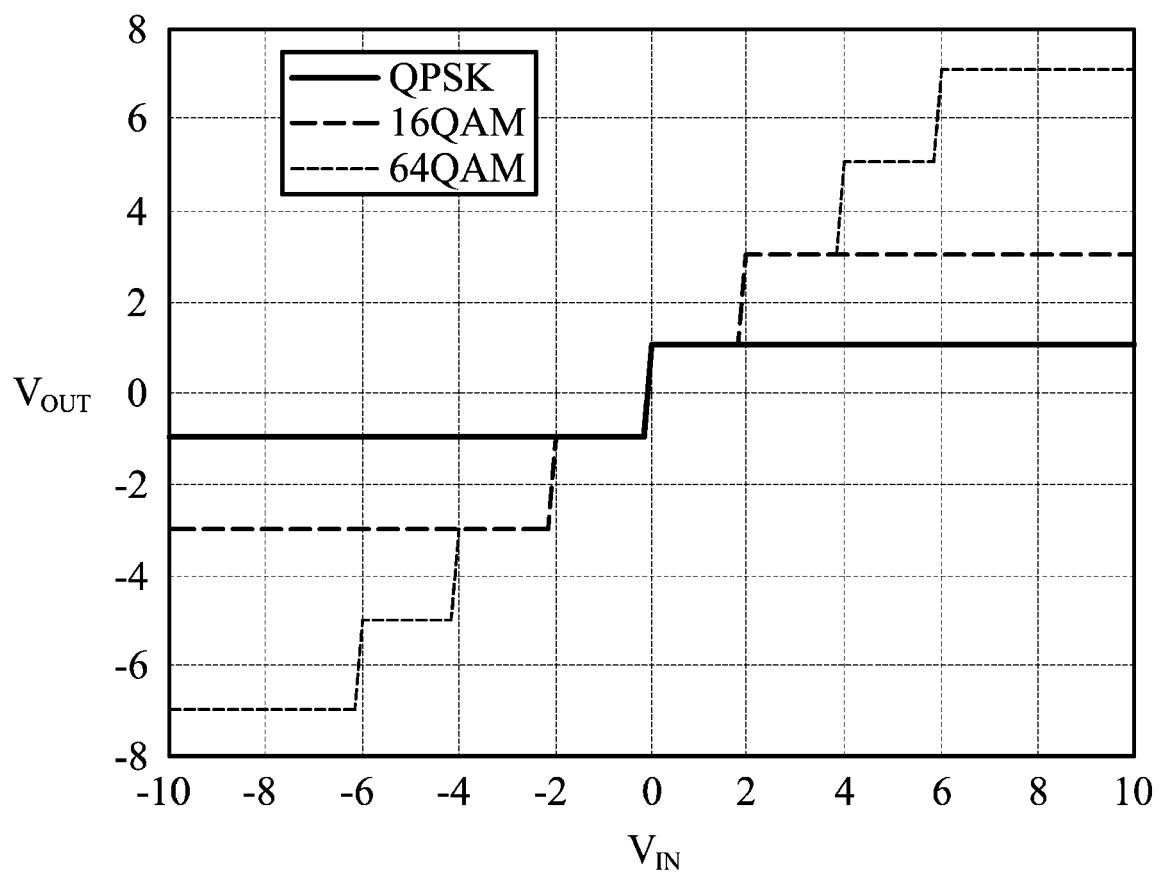
FIG. 6 shows transfer curves of a QPSK quantizer, a 16QAM quantizer and a 64QAM quantizer in accordance with an embodiment.

FIG. 6 shows transfer curves of the QPSK quantizer 510, 16QAM quantizer 520 and 64QAM quantizer 530. Through the control signal #SE, the decision unit 402 in FIG. 5 can be adapted for systems of different modulation schemes such as BPSK, QPSK, 16QAM and 64QAM modulation schemes.

Figure 7:
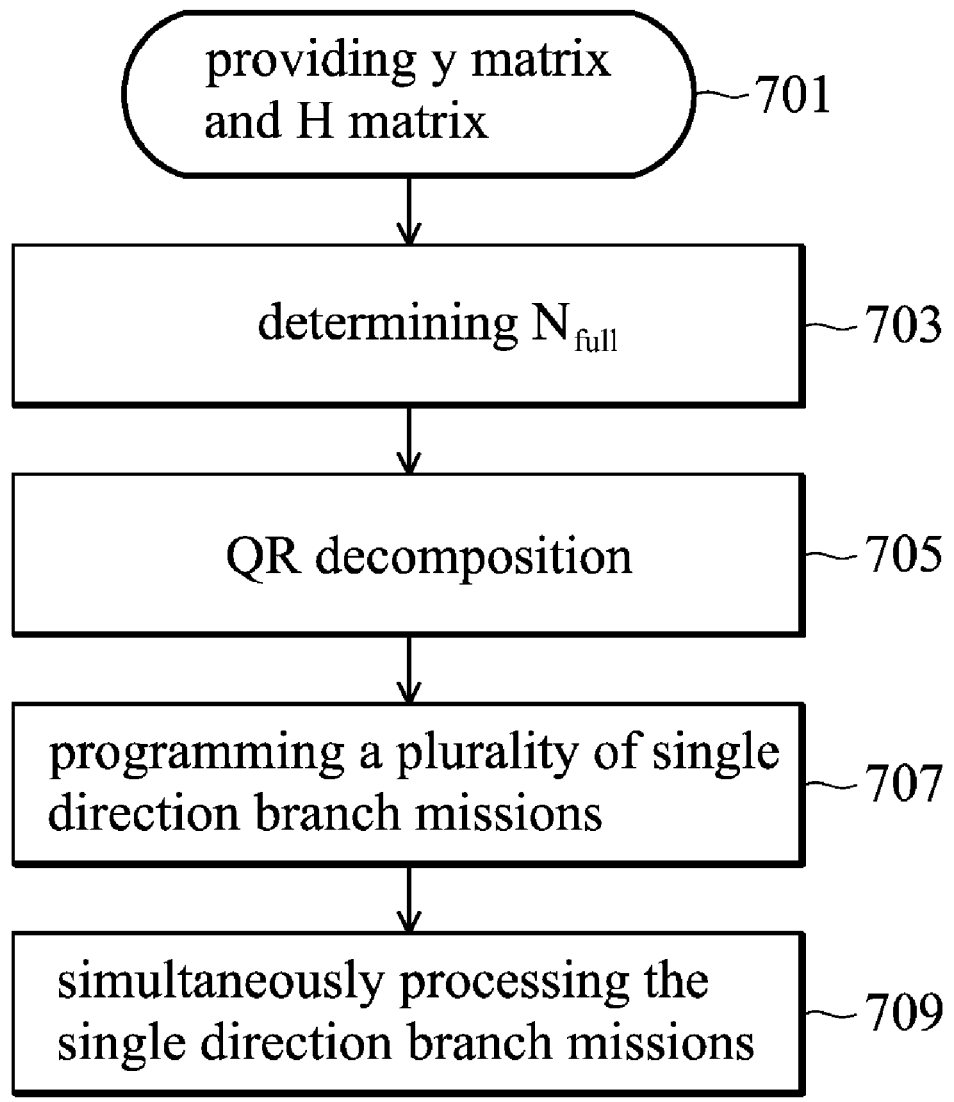
FIG. 7 is a flowchart of the sphere decoding method in accordance with an embodiment.

FIG. 7 is a flowchart of the sphere decoding method in accordance with an embodiment. Based on the described hardware structure, the embodiment can be summarized into the following steps. In step 701, a signal matrix y is received through a plurality of antennas, and a channel response matrix H is obtained. In step 703, the depth for a full search ($N_{full}$) is determined based on the number of transmit antennas and the modulation type. As the $N_{full}$ is determined, only $N_{full}$ layers are examined by using a full search scheme, while the rest of the layers are examined by the single direction search scheme. In step 705, a QR decomposition process is performed on the channel response matrix H to generate a Q matrix and an R matrix. There are various traditional algorithms for QR decomposition, such as the Householder, Modified Gram-Schmidt and Givens rotations algorithms. The embodiment provides an exemplary Householder's algorithm. The channel response matrix H is composed of a plurality of column vectors. In the embodiment, a particular sorting method is proposed to enable the hybrid search scheme and further reduce the complexity of the search process. Based on the sorting method, a generated R matrix is characterized to have the $N_{full}$ smallest diagonal elements aligned to the most lower-right corner, while the other diagonal elements sorted from the upper-left to the lower-right in an incremental order. For example, if $N_{full}$ is 2, all nodes in the layers $L_8$ and $L_7$ in FIG. 2 are fully searched, whereas the other layers are only examined by a single direction search scheme. The $N_{full}$ is not limited to be 2. In step 707, as the search tree is organized, it is further separated into a plurality of single direction branch missions. As described, the complexity of a search tree is proportional to the total search combinations. For example, if the search tree is reorganized into [8×8×1×1×1×1×1×1], only 64 single direction branch missions, each corresponding to one possible solution, are required to be examined. In step 709, the Euclidean distance calculators 310 in FIG. 3 are used to process a plurality of single direction branch missions in parallel. Since every Euclidean distance calculator 310 comprises a plurality of calculation units 312 cascaded in a pipeline structure, each calculation unit 312 can be simultaneously assigned to process a newly added node within in a single direction branch mission at each stage under the control of the scheduler 320.

The proposed sphere decoding method is particularly applicable to MIMO systems, thus the channel response matrix H is typically a matrix generated by a first number of transmit antennas and a second number of receiver antennas. Each layer of the search tree shown in FIG. 2 corresponds to a real part or an imaginary part of a transmitted symbol from one particular transmit antenna, and the nodes in each layer represent all possible symbol values of the real part or imaginary part of the transmitted symbol.

Figure 8:
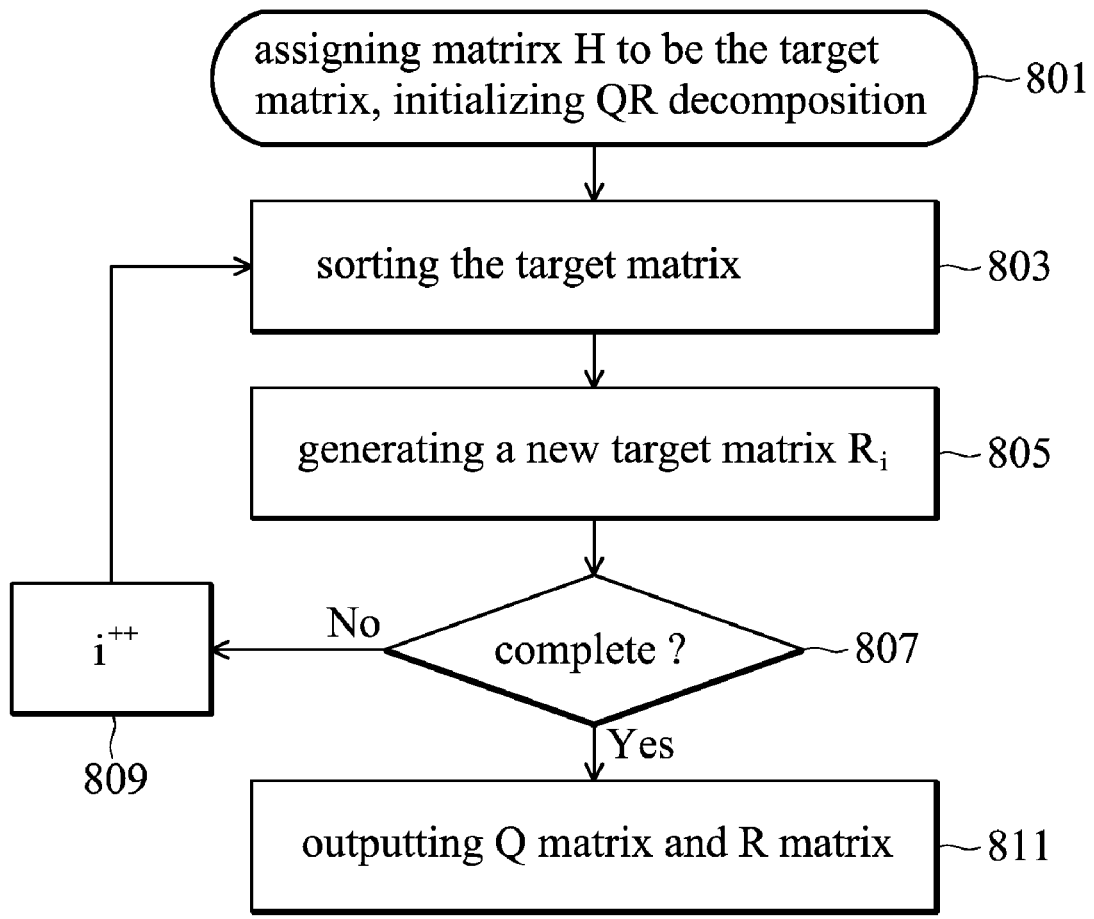
FIG. 8 is a flowchart of the QR decomposition process in accordance with an embodiment in FIG. 7.

FIG. 8 is a flowchart of QR decomposition in accordance with an embodiment to FIG. 7. The channel response matrix H is composed of a plurality of column vectors, and the QR decomposer 304 recursively generates a set of intermediate matrices $G_1, G_2, G_3 \ldots G_M$ and target matrices $R_1, R_2, R_3 \ldots R_M$ during the progress of the QR decomposition, such that, $R_1 = G_1 H$,
$R_2 = G_2 G_1 H$,
$R_3 = G_3 G_2 G_1 H$,
$R_{M-1} = G_{M-1} \ldots G_2 G_1 H$,
$R = R_M = G_M G_{M-1} \ldots G_2 G_1 H$,
where R is an upper triangular matrix, and
$G_1 G_2 \ldots G_{M-1} G_M = Q$.

During the QR decomposition, a particular sorting method is applied to rearrange column vectors within the target matrices H, $R_1, R_2, \ldots R_{M-1}$ such that the eventual R matrix comprises the $N_{full}$ smallest diagonal elements aligned to the most lower-right corner, while the other diagonal elements sorted from the upper-left to the lower-right in an incremental order.

In step 801, the channel response matrix H is used as a target matrix to initialize the QR decomposition process. In step 803, column norms of the column vectors within the target matrix are calculated. Thereafter, the QR decomposer 304 performs column switching on the target matrix based on the proposed sorting order, whereby the $(N_{full}+1)^{th}$ least column vector is switched to be the leftmost column among the unprocessed columns in the target matrix. The last unprocessed $N_{full}$ column vectors are not necessarily switched. The column switch process may store an index record to recover the original order of the solution. In step 805, a QR decomposition is performed on the rearranged target matrix to generate matrices $G_i$ and $R_i$, where i denotes the layer index, ranging from 1 to M. In step 807, it is determined whether the QR decomposition is complete. If not, step 809 is processed to step into the next layer, and the matrix $R_i$ is used as a target matrix to repeat step 803. The dimensions of intermediate matrices are gradually downgraded as the process progresses. For example, when the QR decomposition is performed for the first time, the dimension of the channel response matrix H is 8×8. For the second time, the dimension of the target matrix $R_1$ is 7×7. For the third time, the dimension of the target matrix $R_2$ is 6×6, and so on. The QR decomposition process is complete when it progresses to the target matrix $R_8$, and the Q matrix and R matrix are output in step 811. Therefore the QR decomposer performs a plurality of downgrade operations to process a target matrix column by column, and calculates column norms of every column vector in the target matrix.

Figure 9A:
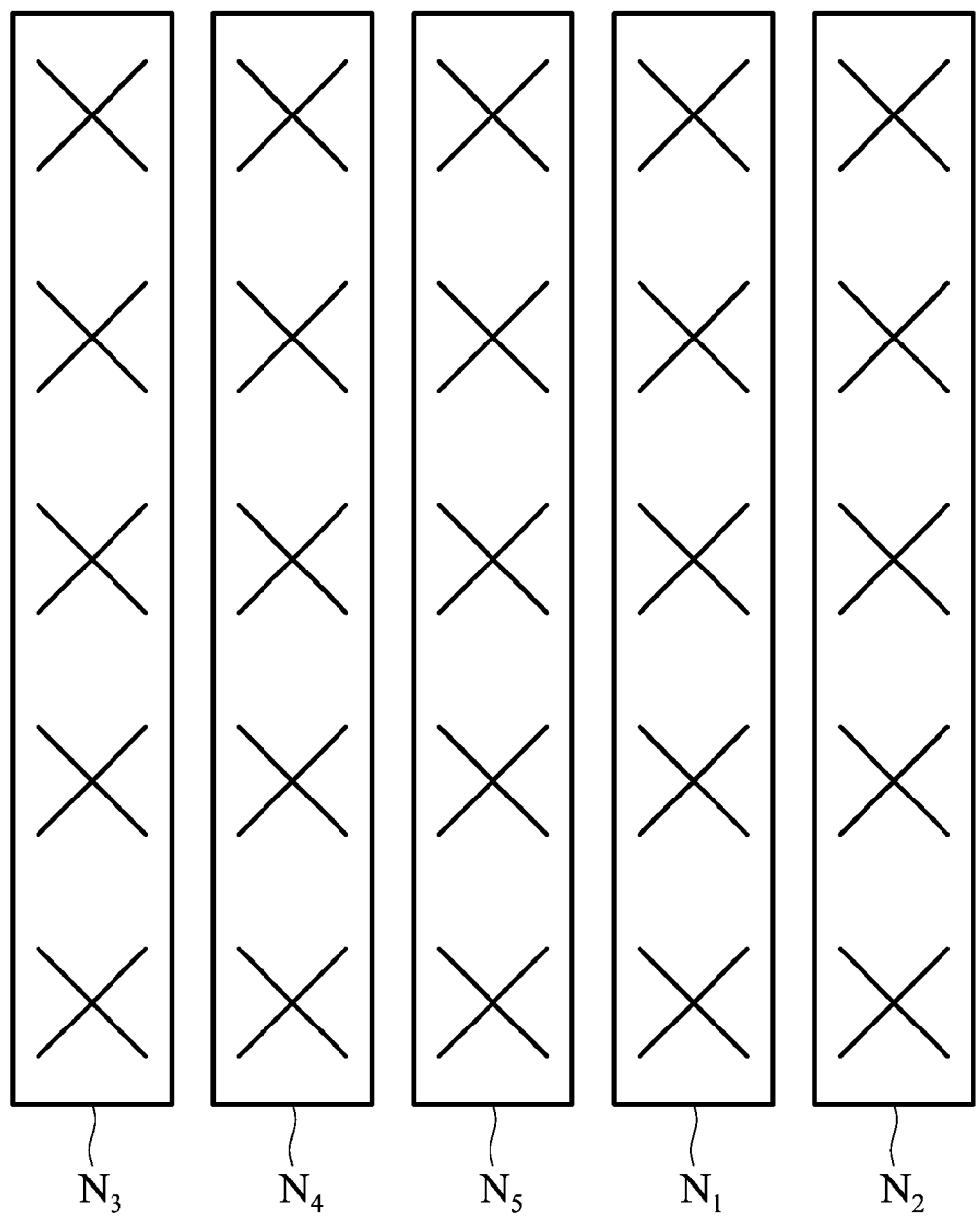
FIGS. 9a to 9d show the QR decomposition process in accordance with an embodiment.

FIGS. 9a to 9d show the progress of QR decomposition. To facilitate the presentation, FIG. 9a shows a 5×5 channel response matrix H with $N_{full}$ set to 2. Firstly, the channel response matrix H is sorted as described in step 803, thereby the column $N_5$ having the $3^{rd}$ least norm value is switched to the leftmost side, and the others can be arranged arbitrarily.

Figure 9B:
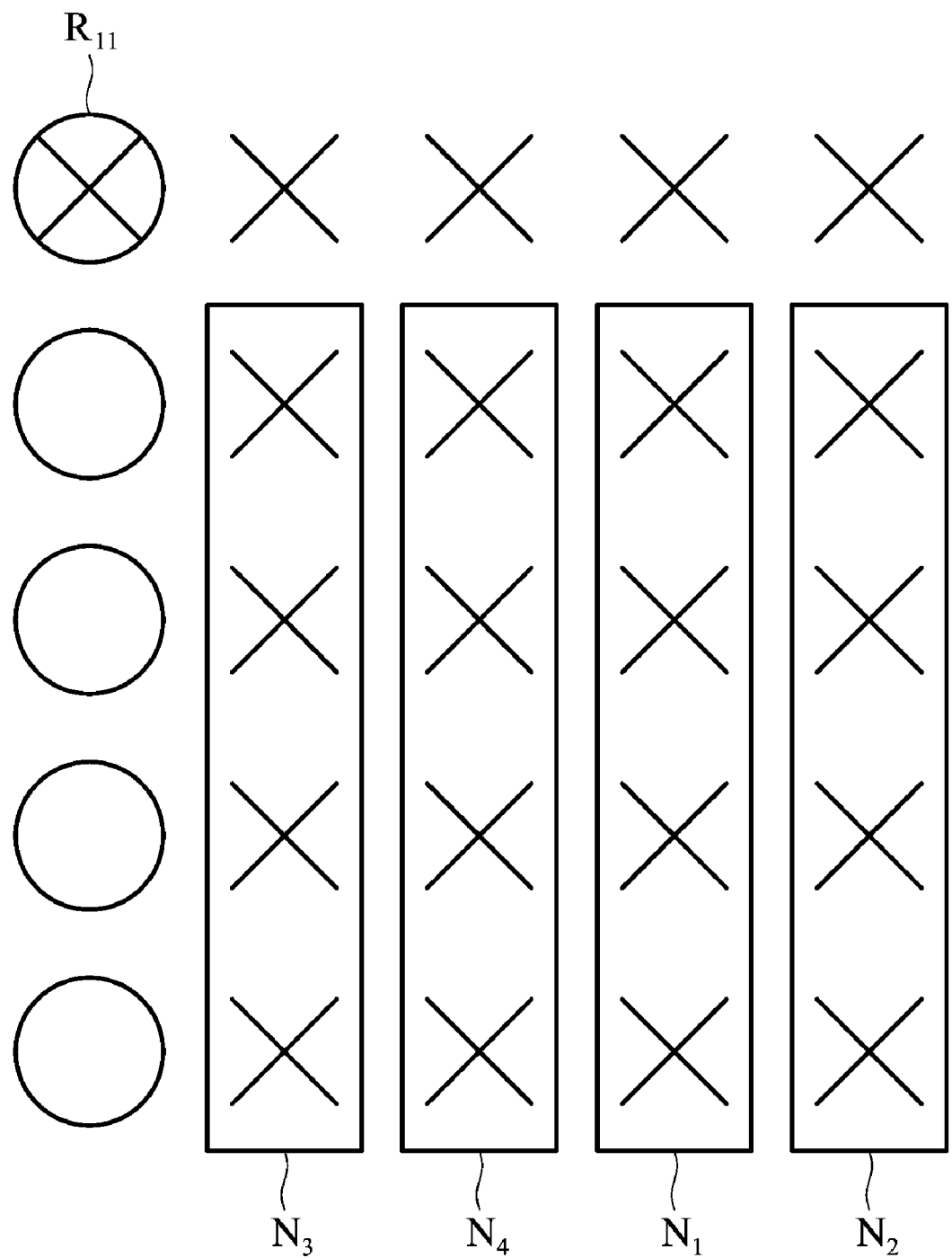

FIG. 9b shows an updated target matrix $R_1$, in which all elements in the first column are set to 0 except for the diagonal element $R_{11}$. The target matrix $R_1$ is recursively sorted through step 803, wherein the 4×4 lower-right portion is termed as an unprocessed part. The norm values of the 4×4 portion are calculated as a basis for further column switching. Analogous to the previous steps, the column $N_4$ having the $3^{rd}$ least norm value is switched to the leftmost side of the 4×4 portion, and the other columns are arranged arbitrarily. Thereafter, the sorted matrix $R_1$ is further decomposed into a target matrix $R_2$ and an intermediate matrix $G_2$ (not shown).

Figure 9C:
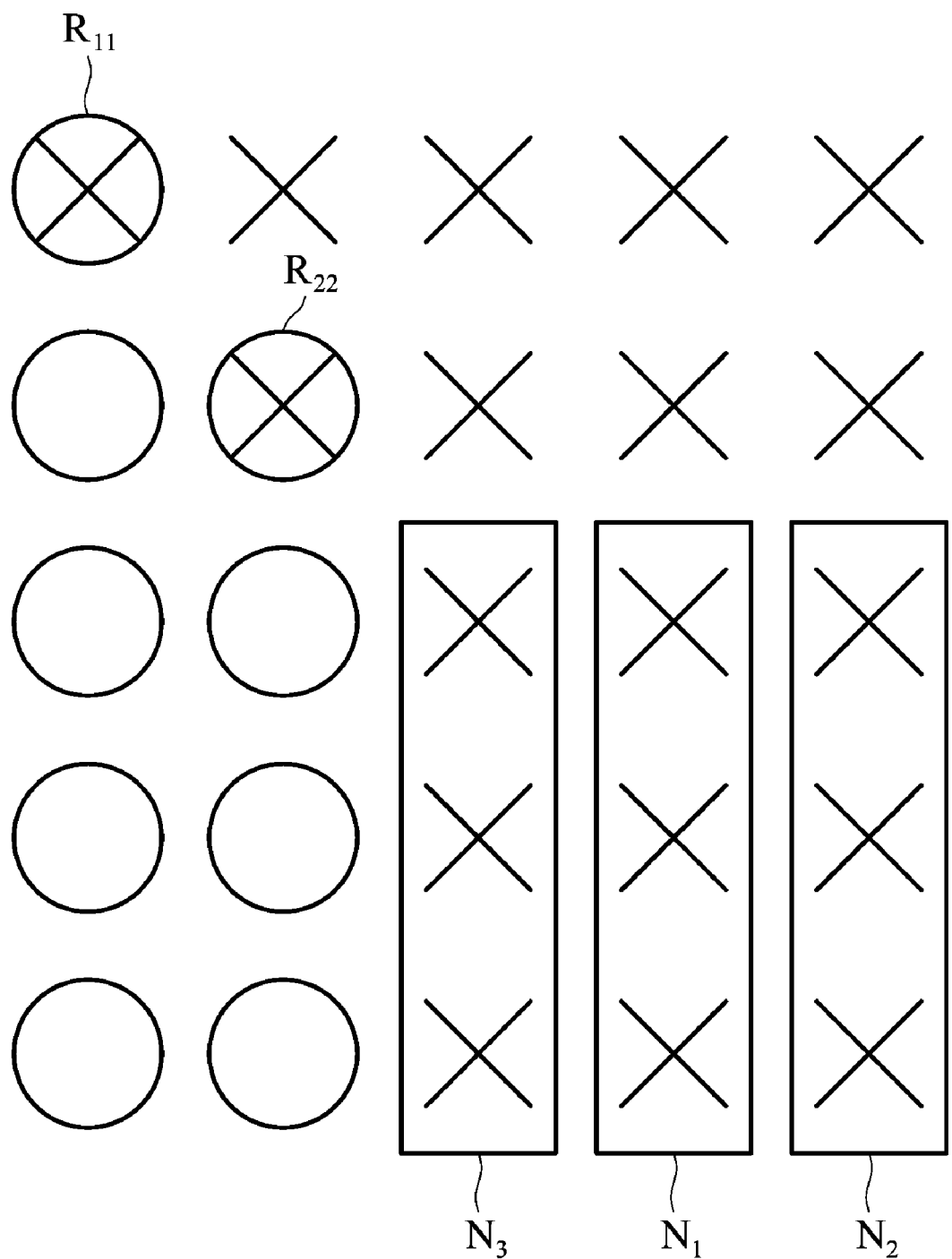
Figure 9D:
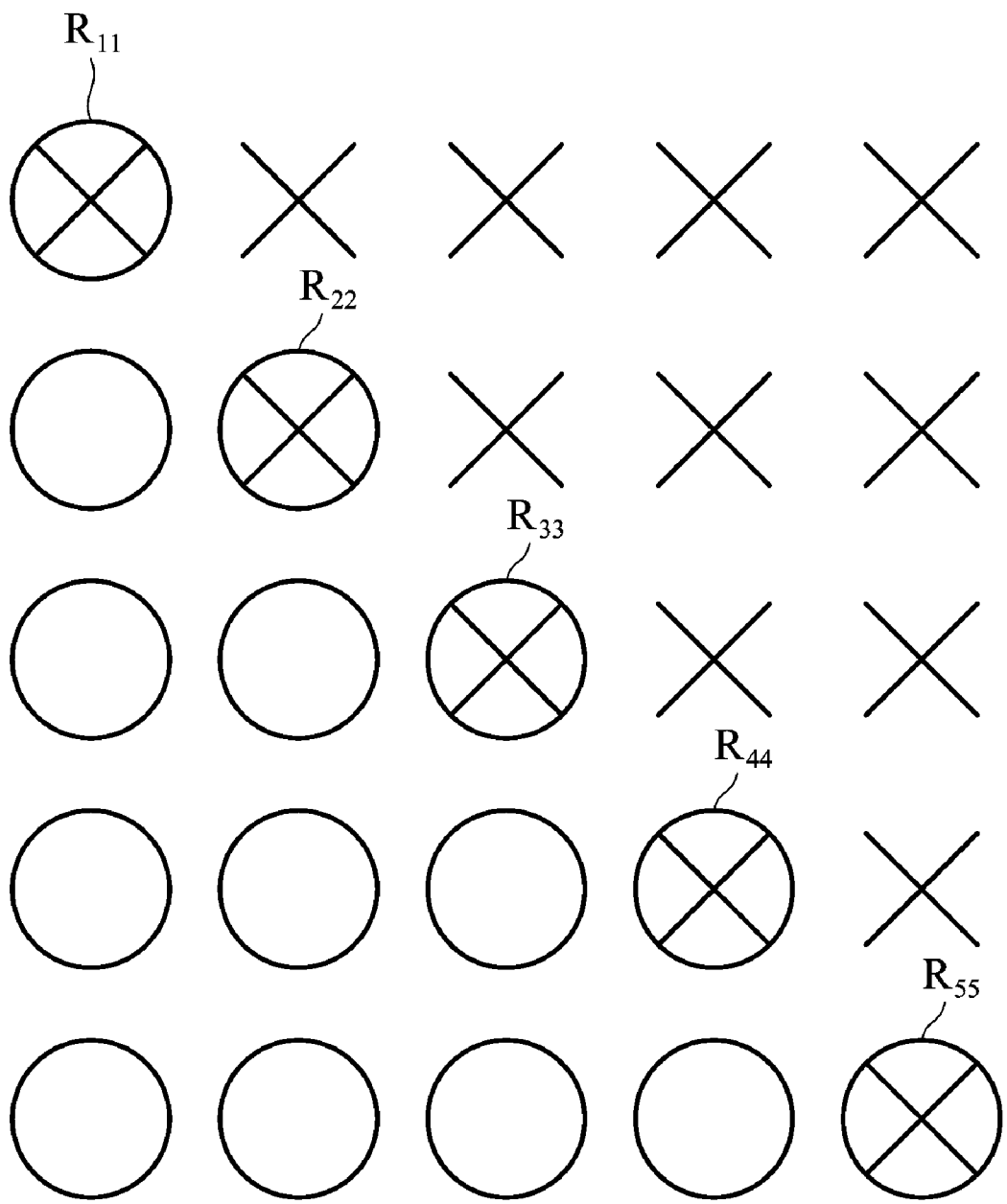

FIG. 9c shows a target matrix $R_2$ generated from the sorted matrix $R_1$ in FIG. 9b. The target matrix $R_2$ is repeatedly sorted through step 803, wherein the 3×3 lower-right portion is termed as an unprocessed part. The column norms are calculated as a basis for a column switch process. Like the previous steps, the column of the $3^{rd}$ least column norm is switched to the leftmost side of the 3×3 portion while the others are arranged arbitrarily. The QR decomposition proceeds until the dimension of $R_i$ is downgraded to 2×2. The last 2 columns can be arranged at will. Eventually, an upper triangular matrix R is obtained, comprising diagonal elements $R_{11}$ to $R_{55}$. Meanwhile, a corresponding Q matrix (not shown) can be generated. The embodiment of FIG. 9 is thereby implemented.

Because of the nature of the sphere decoding algorithm, the node at the lowest layer does not cause the error propagation issue in calculating Euclidean distance, so it is also a possible method to select a column with the least norm value as the first column in the first target matrix H, while the successive target matrices can still follow the described sorting procedure.

Therefore, in the embodiment, the sorting rule has two alternatives. 1. For the first time when sorting is performed, the column of a least column norm is switched to the rightmost side of the target matrix, and in the following downgrading process, the column of $(N_{full}+1)^{th}$ least norm value is switched to the leftmost side of the unprocessed portion in the target matrix until the number of unprocessed columns is downgraded to $N_{full}$, the column switching procedure is stopped. 2. The column of $(N_{full}+1)^{th}$ least norm value is switched to the leftmost side of the target matrix for the first time, and the same rule is applied until the number of unprocessed columns is downgraded to $N_{full}$, the column switching procedure is stopped.

In summary, the exemplary embodiment provides a simplified sphere decoding method, wherein the search tree is efficiently sorted for a hybrid search scheme to lower search complexity. Additionally, the search tree can be separated into a plurality of single direction search missions, allowing hardware to implement pipelined and parallel computations. The proposed circuit structure features high speed and high flexibility. Since the search tree is established on a real number model, the hard decision units can be implemented in a simple structure, and furthermore, complex computations required in the conventional method are avoided by shifters and adders. Although the embodiment merely describes four antennas and a 64QAM modulation, the embodiment is also applicable to other MIMO systems of different number of antennas and different modulation schemes.

Other embodiments will be apparent to those skilled in the art from consideration of the specification and practice of the embodiment disclosed here. This application is intended to cover any variations, uses, or adaptations of the embodiment following the general principles thereof and including such departures from the present disclosure as come within known or customary practice in the art. It is intended that the specification and examples be considered as exemplary only, with a true scope and spirit of the embodiment being indicated by the following claims.

It will be appreciated that the present embodiment is not limited to the exact construction that has been described above and illustrated in the accompanying drawings, and that various modifications and changes can be made without departing from the scope thereof. It is intended that the scope of the embodiment only be limited by the appended claims.

What is claimed is:

1. A symbol detector, for receiving a baseband signal to search for a maximum likelihood solution using a sphere decoding algorithm, comprising:
    a QR decomposer, performing a QR decomposition process on a channel response matrix to generate a Q matrix and an R matrix;
    a matrix transformer, coupled to the QR decomposer, generating an inner product matrix of the Q matrix and the baseband signal;
    a memory, coupled to the matrix transformer and the QR decomposer, buffering the R matrix and the inner product matrix;
    a scheduler, for determining a searching sequence of a plurality of independent branch missions originated from a search tree; and
    a plurality of Euclidean distance calculators, coupled to the scheduler and controlled by the scheduler to operate in parallel, wherein each comprise a plurality of calculation units cascaded in a pipeline structure to calculate the maximum likelihood solution based on the R matrix and the inner product matrix,
    wherein the channel response matrix comprises a plurality of column vectors,
    and wherein the QR decomposer sorts the column vectors in a particular order so that the generated R matrix comprising $N_{full}$ smallest diagonal elements arranged at the most lower right corner, and the other diagonal elements sorted from the upper-left to the lower-right in an incremental order, where $N_{full}$ is a variable denoting a full search depth.

2. The symbol detector as claimed in claim 1, wherein the QR decomposer performs a plurality of downgrade operations to process a target matrix column by column and calculates the column norm of each unprocessed column in the target matrix, wherein the unprocessed column is a column which is still non-orthogonal to other columns in the QR decomposition process.

3. The symbol detector as claimed in claim 2, wherein the particular order is:
    when processing the target matrix for the first time, a column of the least column norm is the leftmost column in the target matrix;
    when processing the target matrix for the second or later times, a column of the $(N_{full}+1)^{th}$ least norm value is switched to be the leftmost column among the unprocessed columns in the target matrix; and
    when the number of unprocessed columns is decreased to $N_{full}$, the column switching procedure is stopped.

4. The symbol detector as claimed in claim 2, wherein the particular order is:
    whenever the target matrix is processed, a column of the $(N_{full}+1)^{th}$ least norm value is switched to be the leftmost columns among the unprocessed columns in the target matrix; and
    when the number of unprocessed columns is decreased to $N_{full}$, the column switching procedure is stopped.

5. The symbol detector as claimed in claim 1, wherein the symbol detector is employed in a Multiple-In-Multiple-Out (MIMO) system, wherein:
    the channel response matrix is generated by a first number of transmit antennas and a second number of receiver antennas;
    each layer of the search tree is associated to a real part or an imaginary part of a transmitted symbol, comprising a plurality of nodes each corresponds to a possible symbol value of the real part or the imaginary part.

6. The symbol detector as claimed in claim 5, wherein when the search tree is organized, the scheduler takes the search tree apart into a plurality of single direction branch missions, and directs the Euclidean distance calculators to process the single direction branch missions in a predetermined sequence.

7. The symbol detector as claimed in claim 5, wherein:
    each Euclidean distance calculator performs sphere decoding processes by employing the pipeline of a plurality of cascaded calculation units to synchronously examine a plurality of nodes at different layers for different single direction branch missions; and
    each calculation unit performs a partial Euclidean distance (PED) calculation for each newly examined node, comprising:
        an estimation unit, receiving the inner product matrix, the R matrix and prior layer node values to calculate a sphere center; and
        a distance accumulator, calculating a current layer PED based on the sphere center, all prior nodes, and a prior layer PED.

8. The symbol detector as claimed in claim 7, wherein:
    when there is a need to program more than one node at a particular layer to branch out a partial search path, the scheduler determines a priority order according to the sphere center; and
    a node closer to the sphere center is given a higher processing priority by the calculation unit.

9. The symbol detector as claimed in claim 7, wherein the estimation unit calculates the sphere center based on the following Formula:

$$\tilde{s}_{m|m+1} = \frac{-1}{r_{m,m}} \left\{ \sum_{j=m+1}^{M} r_{m,j}(s_j - 1) + \sum_{j=m+1}^{M} r_{m,j} - \tilde{y}_m \right\},$$

where m represents a currently examined layer index, M denotes the top layer index while 1 is the bottom layer index;
$\tilde{S}_{m|m+1}$ is the sphere center;
$r_{m,m}$ is the $m^{th}$ diagonal element in the R matrix, and $r_{m,j}$ is the $(m,j)^{th}$ element in the R matrix;
$s_j$ is a node at the $j^{th}$ layer examined by a current single direction branch mission; and
$\tilde{y}_m$ is the $m^{th}$ element value in the inner product matrix.

10. The symbol detector as claimed in claim 8, wherein the distance accumulator calculates the current layer PED based on the following Formula:

$$PED_m = PED_{m+1} + r_{m,m}^2 (S_m - \tilde{S}_{m|m+1})^2,$$

where $PED_m$ is the PED accumulated from the top layer to the $m^{th}$ layer, and $S_m$ is a possible hard decision value at the $m^{th}$ layer.

11. The symbol detector as claimed in claim 10, wherein the distance accumulator comprises a decision unit for generating the hard decision value according to the sphere center, comprising:
    a first subtractor, decreasing an input value by 1;
    a first shifter, right shifting the decreased input value by one bit;
    a 1-bit BPSK/QPSK quantizer, a 2-bit 16QAM quantizer and a 3-bit 64QAM quantizer;
    a first selector and a second selector, selectively connecting the first shifter to one of the BPSK/QPSK quantizer, 16QAM quantizer and 64QAM quantizer based on a selection signal, allowing the shifted value to be quantized;

a second shifter, receiving a quantized result from the BPSK/QPSK quantizer, the 16QAM quantizer or the 64QAM quantizer through the second switch, and left shifting the quantized result by one bit; and a first adder, adding a left shifted result from the second shifter by 1 to generate an output value; wherein the input value is the sphere center, and the output value is the hard decision value.

12. The symbol detector as claimed in claim 10, wherein:
the symbol detector further comprises a register for storing an upper limit value;
each distance accumulator comprises a comparator, comparing the current PED with the upper limit value;
if the current PED is lower than the upper limit value, the Euclidean distance calculator continues the single direction branch mission; and
if the current PED exceeds the upper limit value, the Euclidean distance calculator stops the single direction branch mission.

13. The symbol detector as claimed in claim 11, wherein:
when a single direction branch mission is finished, the Euclidean distance calculator outputs a Euclidean distance (ED) and compares the ED with the upper limit value; and
if the ED is less than the upper limit value, the upper limit value is updated to be the ED.

14. The symbol detector as claimed in claim 11, wherein when all single direction branch missions are finished, a path with the ED corresponding to the upper limit value is claimed as the maximum likelihood solution.

15. A sphere decoding method, for receiving a baseband signal to search a maximum likelihood solution, comprising:
performing a QR decomposition process on a channel response matrix to generate a Q matrix and an R matrix;
generating an inner product matrix of the Q matrix and the baseband signal;
buffering the R matrix and the inner product matrix;
determining a searching sequence of a plurality of independent branch missions originated from a search tree; and
calculating the maximum likelihood solution based on the R matrix and the inner product matrix,
wherein the channel response matrix comprises a plurality of column vectors,
and wherein the QR decomposition process comprises sorting the column vectors in a particular order to generate an R matrix comprising $N_{full}$ smallest diagonal elements arranged in the most lower-right corner while the other diagonal elements sorted from the upper-left to the lower-right in an incremental order, where $N_{full}$ is a variable denoting the full search depth.

16. The sphere decoding method as claimed in claim 15, wherein the QR decomposition process comprises, performing a plurality of downgrade operations to process a target matrix column by column and calculates the column norm of each unprocessed column in the target matrix, wherein the unprocessed column is a column which is still non-orthogonal to other columns in the QR decomposition process.

17. The sphere decoding method as claimed in claim 16, wherein the particular order is:
when processing the target matrix for the first time, a column of the least column norm is the leftmost column of the target matrix;

when processing the target matrix for the second or later times, a column of the $(N_{full}+1)^{th}$ least norm value is switched to be the leftmost column among the unprocessed columns in the target matrix; and
when the number of unprocessed columns is decreased to $N_{full}$, the column switching procedure is stopped.

18. The sphere decoding method as claimed in claim 16, wherein the particular order is:
whenever the target matrix is processed, a column of the $(N_{full}+1)^{th}$ least norm value is switched to the leftmost side of the target matrix; and
when the number of unprocessed columns is decreased to $N_{full}$, the column switching procedure is stopped.

19. The sphere decoding method as claimed in claim 17, wherein the sphere decoding method is employed in a Multi-In-Multi-Out (MIMO) system, wherein:
the channel response matrix is generated by a first number of transmit antennas and a second number of receiver antennas;
each layer of the search tree is associated to a real part or an imaginary part of a transmitted symbol; and
each layer of the search tree comprises a plurality of nodes each corresponding to a possible symbol value of a real part or an imaginary part of a transmitted symbol.

20. The sphere decoding method as claimed in claim 19, wherein the step of organizing the search tree comprises taking the search tree apart into a plurality of single direction branch missions, and directing the Euclidean distance calculators to process the single direction branch missions in a predetermined sequence.

21. The sphere decoding method as claimed in claim 20, further comprising:
performing sphere decoding processes by employing the pipeline of a plurality of cascaded calculation units to synchronously examine a plurality of nodes at different layers for different single direction branch missions; and
performing a partial Euclidean distance (PED) calculation for each newly examined node; and
the PED calculation comprising:
receiving the inner product matrix, the R matrix and prior layer node values to calculate a sphere center; and
calculating a current layer PED based on the sphere center, all prior nodes, and a prior layer PED.

22. The sphere decoding method as claimed in claim 21, wherein the step of programming a single direction branch mission comprises, if there is a need to program more than one node at a particular layer to branch out a partial search path, a priority order is determined according to the sphere center, wherein a node closer to the sphere center is given a higher processing priority.

23. The sphere decoding method as claimed in claim 21, wherein the sphere center is calculated based on the following Formula:

$$\tilde{s}_{m|m+1} = \frac{-1}{r_{m,m}} \left\{ \sum_{j=m+1}^{M} r_{m,j}(s_j - 1) + \sum_{j=m+1}^{M} r_{m,j} - \tilde{y}_m \right\},$$

where m represents a currently examined layer index, and M denotes the top layer index while 1 is the bottom layer index;
$\tilde{s}_{m|m+1}$ is the sphere center;
$r_{m,m}$ is the $m^{th}$ diagonal element in the R matrix, and $r_{m,j}$ is the $(m,j)^{th}$ element in the R matrix;

$s_j$ is a node at the $j^{th}$ layer examined by a current single direction branch mission; and $\tilde{y}_m$ is the $m^{th}$ element value in the inner product matrix.

24. The sphere decoding method as claimed in claim 22, wherein calculation of the current layer PED is based on the following Formula:

$$PED_m = PED_{m+1} + r_{m,m}^2 (S_m - \tilde{S}_{m|m+1})^2,$$

where $PED_m$ is the PED accumulated from the top layer to the $m^{th}$ layer, and $S_m$ is a possible hard decision value at the $m^{th}$ layer.

25. The sphere decoding method as claimed in claim 24, wherein generation of the hard decision value according to the sphere center comprises:

decreasing an input value by 1 and right shifting the decreased input value by one bit;

providing a 1-bit BPSK/QPSK quantizer, a 2-bit 16QAM quantizer and a 3-bit 64QAM quantizer;

selectively enabling one of the BPSK/QPSK quantizer, 16QAM quantizer and 64QAM quantizer to quantize the shifted value based on a selection signal;

left shifting a quantized result from the BPSK/QPSK quantizer, the 16QAM quantizer or the 64QAM quantizer by one bit to generate a left shifted result; and adding 1 to the left shifted result to generate an output value, wherein the input value is the sphere center, and the output value is the hard decision value.

26. The sphere decoding method as claimed in claim 24, further comprising:

buffering an upper limit value;

comparing the current PED with the upper limit value;

if the current PED is lower than the upper limit value, continuing the single direction branch mission; and if the current PED exceeds the upper limit value, stopping the single direction branch mission.

27. The sphere decoding method as claimed in claim 26, further comprising:

when a single direction branch mission is finished, outputting a Euclidean distance (ED) and comparing the ED with the upper limit value; and if the ED is less than the upper limit value, updating the upper limit value to be the ED.

28. The sphere decoding method as claimed in claim 27, further comprising, when all single direction branch missions are finished, determining a search path with the ED corresponding to the upper limited value as the maximum likelihood solution.

* * * * *